May 17, 1949.　　　　F. E. ELLITHORPE　　　　2,470,477
WINDSHIELD VISOR MOUNTING BRACKET
Original Filed July 15, 1946
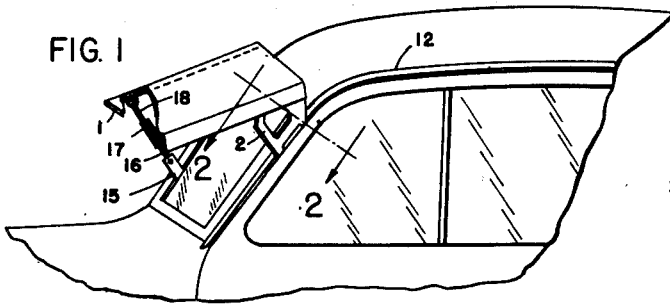
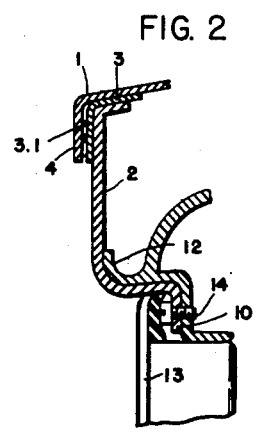
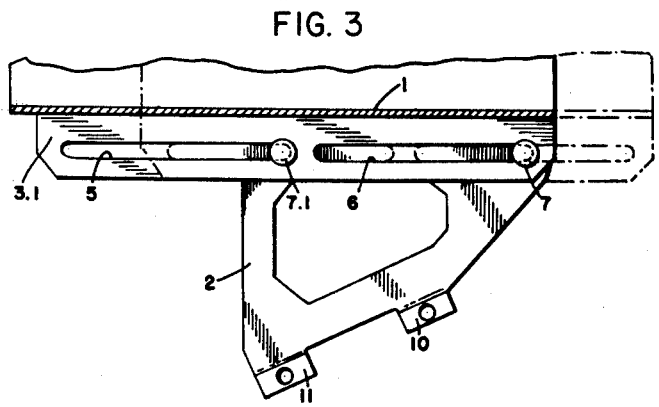
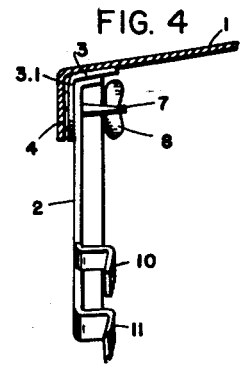
INVENTOR.
FRANK E. ELLITHORPE
BY
ATT'YS Patented May 17, 1949

2,470,477

UNITED STATES PATENT OFFICE 2,470,477

WINDSHIELD VISOR MOUNTING BRACKET

Frank E. Ellithorpe, Glendale, Calif., assignor to The Fulton Company, West Allis, Wis., a corporation of Wisconsin Original application July 15, 1946, Serial No. 683,595. Divided and this application June 12, 1948, Serial No. 32,562

5 Claims. (Cl. 296—95)

This application is a division of my copending application, Serial Number 683,595, filed July 15, 1946, for windshield visor.

This invention relates to visors or sunshades for the windshield of an automobile, and particularly to improved mounting brackets or means for attaching the visors to the body of an automobile in proper position and relation with respect to the sloping windshield of the automobile.

The main objects of this invention are to provide an improved mounting bracket for windshield visors or the like on automobiles; to provide an improved mounting means or bracket for windshield visors whereby no part of the exterior finish of the automobile body need be marred or otherwise damaged during the attachment or detachment of the visor; to provide an improved visor mounting bracket having a maximum of strength and stability in its attachment to the automobile body; to provide a visor mounting bracket having improved attachment means for securing the same to the automobile body on the inside of the door frame; to provide such a device wherein the attachment means are accessible only when the adjacent doors are open; to provide such a device wherein the adjacent doors of the automobile, when closed, serve to enclose the attachment means and at the same time clamp the attachment means and the bracket to the door frame; and to provide an improved visor mounting bracket having attachment means reaching inwardly of the door frame for connection thereto and having a sectional contour formed to snugly fit the inside surface of the door frame and the bottom and side curvature of the rain-water gutter, or the outer surface of the vehicle body at the door frames.

A specific embodiment of this invention is shown in the accompanying drawings in which:

Figure 1 is a side view of a visor, as applied over the sloping windshield of an automobile, embodying the improved mounting brackets.

Fig. 2 is a sectional view as taken on line 2—2 of Fig. 1, showing the improved manner of attaching the visor supporting brackets to the automobile body.

Fig. 3 is a view in side elevation of a left-hand visor supporting bracket, showing the visor in section and an arrangement for attaching the visor to the bracket, and Fig. 4 is an end view of the same with the visor in section.

In the form shown in the drawings, the automobile visor comprises a shield or awning 1, disposed transversely across the upper part of the rearwardly sloping windshield of an automobile so as to project outwardly over the same, suitably supported on a pair of end brackets or supporting members 2, which in turn are secured to the automobile body on the inside of the respective adjacent door frames and project upwardly therefrom on the outside of the body adjacent the upper part of the windshield.

The visor panel or awning may be of any suitable construction and may be made from any suitable rigid or semi-rigid material such as aluminum, wood or wood composition, fabric, stainless steel, or a suitable plastic compound, and may be made of one or more pieces, preferably having downwardly turned opposite ends so as to present a smooth, unbroken appearance over its entire upper surface.

As shown in Figs. 2 and 4, suitable angle members 3 are provided at each end of the visor 1 on the inside of the downwardly turned ends 4, which angle members are disposed with their vertical legs adjacent and spaced inwardly a short distance from the said turned ends 4 and are secured to the inner or lower surface of the visor by any suitable means, such as spot welding when the visor is made of metal.

The downwardly projecting leg of the angle member 3 thus provides an end-flange 3.1 for the visor by means of which the visor is mounted on the improved supporting member or bracket 2. As indicated in Fig. 3, the end-flange 3.1 may be provided with a pair of longitudinal slots 5 and 6 which are aligned with each other and are horizontally directed, and the visor is mounted on, or attached to, the supporting bracket 2 by means of bolts 7 and 7.1, which pass through the slots 5 and 6 of the flange 3.1 and into suitable apertures in the bracket 2.

Preferably bolts 7 and 7.1 are each provided with square shanks adjacent the head portion, so that they will not turn in the slots 5 and 6, and are positioned in the slots 5 and 6 prior to the fastening of the angle members 3 onto the awning or visor, the heads of the bolts 7 and 7.1 occupying the space between the flange 3.1 and the downwardly turned end 4 of the visor. The bolts 7 and 7.1 thus serve as pintles or gudgeons on which the visor end-flange 3.1 is supported and may be adjusted, and the rearward bolt 7 may serve as a pivot about which the end-flange 3.1 can turn or swing for vertical angular adjustment of the visor as will be hereafter described. Suitable clamping means, such as wing nuts 8, may be provided on the bolts 7 and 7.1 for the purpose of clamping or securing the visor to the bracket 2 when the visor is set or adjusted to the desired position.

It will be understood that two of the improved supporting members or brackets 2 are required, one right-hand and one left-hand, to fit the respective sides of the automobiles to which they are to be attached. Since these brackets are identical in construction, except for the hand, only one of the brackets will be described in detail.

As before mentioned, the bolts 7 and 7.1, which secure the visor end-flange 3.1 to the bracket 2, pass through suitable apertures located adjacent the uppermost edge of the bracket. The rearward bolt 7 passes through an annular hole in the rear upper margin of the bracket 2 so as to be held in a fixed position thereon and the bracket aperture for the forward bolt 7.1, nearest the overhanging part of the visor, may be in the form of a slot disposed at substantially right angles to the upper edge of the bracket 2, or transversely of the slot 5 in the flange 3.1, so that a tilting movement or angular adjustment of the visor may be obtained, the end-flange 3.1 of the visor pivoting about the rearward bolt 7.

As shown in Fig. 3, and as before mentioned, horizontal shifting of the visor may be obtained by means of the slots 5 and 6 in the visor end-flanges 3.1. Thus the visor may be shifted horizontally to vary the extent of the overhang over the windshield of the automobile, and the forward edge of the visor may also be tilted vertically so as to vary the angular relationship of the visor with respect to the sloping windshield to which it is applied.

As shown, the improved visor supporting member or bracket 2 is a somewhat triangularly shaped form, the upper side of which is arranged to fit within and along the legs of the angle member 3, secured to the visor, and the opposite side of which is provided with integral inwardly turned lugs or attaching flanges 10 and 11, which reach laterally or inwardly into the adjacent door opening and by means of which the bracket 2 is secured to the inside of the automobile door frame.

Preferably the flanges or lugs 10 and 11 are bent from the body of the bracket 2 on a radius such that the lugs will fit the outer curvature of the gutter 12, which is usually provided on the outside of the automobile body along the upper and forward margins of the door openings. The flanges 10 and 11 are thus shaped to fit the gutter snugly and their inwardly reaching ends are turned downwardly so that they will lie flatly against the inside surface of the door frame, within and rearwardly beneath the margin of the overlapping flange 13 on the automobile door.

In the arrangement shown, the flanges or lugs 10 and 11 of the bracket 2 are secured to the automobile body by means of suitable screws or attaching means 14 which are engaged in suitably tapped holes in the inside of the door frame and co-act with the rearwardly reaching portions of the flanges or lugs to hold the improved mounting bracket 2 securely in place. Thus the bracket 2 is readily mounted on or attached to the automobile body in such a way that no visible holes or marring of the exterior body finish will occur, the bracket 2 projecting vertically upward from the automobile body adjacent the upper portion of the windshield, and the attaching or securing means are hidden by the automobile door.

The securing or attaching means for the visor mounting brackets 2 are thus accessible only when the adjacent doors of the automobile are open, which obviates the possibility of the mounting brackets being removed or stolen when the vehicle doors are locked. Also, when the attaching means 14 are installed horizontally in the rearwardly reaching portions of the flanges or lugs 10 and 11, as shown in Fig. 2, the overlapping flange 13 of the automobile door will normally bear tightly against the head of the attaching means 14 when the door is closed, and serve to further clamp and secure the visor mounting bracket 2 against the door frame and prevent the attaching means from working loose due to vibration transmitted from the visor through the mounting brackets.

Usually the supporting member or bracket 2 will be mounted on the automobile body in a portion of the door frame where the curvature of the door line begins. Hence it will be understood that the inwardly turned or rearwardly reaching lugs or flanges 10 and 11 of the bracket 2 will be formed so as to accommodate the curvature of the door frame at the preferable point of mounting.

As shown in Fig. 1, the visor is preferably supported at its center, in addition to the improved mounting brackets 2, and such support may be provided by means of an adjustable supporting member which has one end suitably secured to the center part of the visor and its other end clamped to the vertical dividing bar at the center of the windshield.

Such a supporting member may comprise a clamp 15, adapted to fit around and be clamped to the center bar of the windshield, which clamp is pivotally connected to a threaded rod 16, having threaded connection with an elongated nut 17. A second threaded rod 18, having a thread of the opposite hand of the rod 16, is screwed into the opposite end of the nut 17, which is threaded accordingly, and is pivoted at its end to a suitable bracket, not shown, mounted on the inside of the visor at its center portion. Such a center support for the visor is adjustable to accommodate vertical adjustment of the leading edge of the visor by merely turning the elongated nut 17, the nut together with the threaded rods 16 and 18 being in the nature of a turn buckle.

The main advantages of my improved visor mounting bracket reside in the simple construction of the bracket and the arrangement of the attaching means whereby the mounting brackets are firmly attached to the automobile body at a place where the greatest stability and mounting strength may be obtained. Other advantages are to be found in the arrangement of the integral attaching flanges on the visor mounting bracket which are arranged to reach inwardly into the door opening to effectively resist forward and upward displacement of the brackets, and the disposition of the attaching means where they are hidden from view and accessible only when the respective door is open.

Further advantages reside in the arrangement of the mounting bracket attaching flanges so that they reach rearwardly beneath the door, when the same is closed, whereby additional clamping and security of the visor mounting bracket and the attaching means is obtained from the door itself. Still further advantages reside in the fact that, with the improved visor mounting bracket and attachment arrangement, there is no visible marring of the exterior body finish of the automobile when the visor is applied or removed.

Although but one specific embodiment of this invention is herein shown and described, it will

I claim:

1. A visor for the windshield of a vehicle having doors at opposite sides of the windshield, said visor comprising a rigid panel assemblage adapted for disposition above the windshield, a supporting bracket attached to each of the opposite ends of said assemblage, each of said brackets having an integral attaching flange reaching inwardly into the adjacent door opening and rearwardly beneath the corresponding door when closed, and attaching means coacting with the rearwardly reaching portions of said flanges and being accessible only when the adjacent doors are open.

2. A visor for the windshield of a vehicle having doors at the opposite sides of the windshield, said visor comprising, a panel assemblage adapted for disposition above the windshield, a supporting bracket attached to each of the opposite ends of said assemblage, each of said brackets having an integral attaching flange reaching inwardly into the adjacent door opening and rearwardly beneath the corresponding door when closed, and attaching means coacting with said flanges within said openings and being accessible only when the adjacent doors are open.

3. A visor for a vehicle windshield having corner posts and side doors at its opposite ends, said visor comprising, a panel assemblage adapted for swingably adjustable disposition above and forwardly of the windshield, a supporting bracket pivotally attached to each of the opposite ends of said assemblage, each of said brackets having a rigid attaching flange reaching inwardly in back of the adjacent corner post and into the door opening adjoining such post, and attaching means coacting with said flanges and the adjacent posts and being accessible only when the corresponding doors are open.

4. A visor for a vehicle windshield having corner posts and side doors at its opposite ends, said visor comprising, a panel assemblage adapted for disposition above the windshield, a supporting bracket attached to each of the opposite ends of said assemblage, each of said brackets having a rigid attaching flange reaching inwardly in back of the adjacent corner post and into the door opening adjoining such post, and means accessible only when the corresponding doors are open for attaching said brackets to the adjacent posts.

5. A visor for the windshield of a vehicle having door frames at the opposite sides of the windshield and doors mounted therein, said visor comprising a panel assemblage adapted for disposition above the windshield, a pair of vertically disposed supporting brackets attached one at each end of said visor assemblage, each of said brackets having an integral attaching flange reaching laterally inward into the adjacent door opening behind the respective frame, said attaching flange being curved inwardly to fit tightly against the outside corner contour of said frame and being formed to lie flatly against the rearward face thereof, and attaching means coacting with said flanges and said door frames and being accessible only when the respective doors are open.

FRANK E. ELLITHORPE.

No references cited.